United States Patent
Sarma et al.

(10) Patent No.: US 11,314,145 B1
(45) Date of Patent: Apr. 26, 2022

(54) EFFICIENT ULTRATHIN ALL-DIELECTRIC NONLINEAR OPTICAL DEVICE

(71) Applicant: National Technology & Engineering Solutions of Sandia, LLC, Albuquerque, NM (US)

(72) Inventors: Raktim Sarma, Albuquerque, NM (US); Igal Brener, Albuquerque, NM (US); Michael B. Sinclair, Albuquerque, NM (US); Salvatore Campione, Albuquerque, NM (US); John F. Klem, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/331,314

(22) Filed: May 26, 2021

Related U.S. Application Data

(60) Provisional application No. 63/031,731, filed on May 29, 2020.

(51) Int. Cl.
*G02F 1/355* (2006.01)
*G02F 1/35* (2006.01)
*G02F 1/37* (2006.01)

(52) U.S. Cl.
CPC ............ *G02F 1/3556* (2013.01); *G02F 1/354* (2021.01); *G02F 1/37* (2013.01)

(58) Field of Classification Search
None
See application file for complete search history.

(56) References Cited

U.S. PATENT DOCUMENTS

| | | | |
|---|---|---|---|
| 9,733,545 B2 * | 8/2017 | Belkin | G02F 1/3501 |
| 10,054,839 B1 * | 8/2018 | Brener | G02F 1/3526 |
| 10,128,387 B1 | 11/2018 | Liu et al. | |
| 10,353,269 B2 * | 7/2019 | Rodriguez | G02F 1/3551 |
| 2022/0011646 A1 * | 1/2022 | Semmlinger | G02F 1/37 |

OTHER PUBLICATIONS

S. Gies, R. Sarma, N. Karl, M. Goldflam, J. Klein and I. Brener, "Light-Matter Interaction and Third Harmonic Generation in the Near-Infrared using Plasmonic Metasurfaces and InAs/AlSb Semiconductor Heterostructures," 2020 Conference on Lasers and Electro-Optics (CLEO), 2020, pp. 1-2. (Year: 2020).*

P. Vabishchevich et al., "All-Dielectric Metasurfaces: Optical Nonlinearities and Emission Control," 2019 IEEE Photonics Conference (IPC), 2019, pp. 1-2. (Year: 2019).*

I. Brener, "Extreme Nonlinear Optics with Dielectric Metasurfaces," 2019 Conference on Lasers and Electro-Optics (CLEO), 2019, pp. 1-2. (Year: 2019).*

(Continued)

*Primary Examiner* — Rhonda S Peace
(74) *Attorney, Agent, or Firm* — Martin I. Finston

(57) ABSTRACT

An apparatus and method are provided for generating harmonic light from a pump beam that is impinged on a metasurface comprising a plurality of all-dielectric resonator bodies. A multiple quantum well structure formed in each resonator body includes asymmetric coupled quantum wells having intersubband transition frequencies that couple to Mie resonances of the resonator bodies.

20 Claims, 10 Drawing Sheets

(56) References Cited

OTHER PUBLICATIONS

S. Liu et al., "Optical Nonlinearities in All-Dielectric Metasurfaces," 2018 International Conference on Optical MEMS and Nanophotonics (OMN), 2018, pp. 1-2. (Year: 2018).*
P. P. Vabishchevich et al., "Frequency-mixing in GaAs dielectric metasurfaces," 2017 International Conference on Optical MEMS and Nanophotonics (OMN), 2017, pp. 1-2. (Year: 2017).*
A. Monti, A. Alù, A. Toscano and F. Bilotti, "Engineering the Electric and Magnetic Response of All-Dielectric Metasurfaces through Core-Shell Mie Resonators," 2020 Fourteenth International Congress on Artificial Materials for Novel Wave Phenomena (Metamaterials), 2020, pp. 287-289. (Year: 2020).*
Sarma, R. et al., "An All-Dielectric Polaritonic Metasurface with Giant Second-Order Nonlinear Response," 2020, SAND2020-4856C, Sandia National Laboratories, Albuquerque, NM.
Green, H. K., "Strong Light Matter Interactions at the Nanoscale: Formation of Polaritons in Hybrid Dielectric Metasurfaces," 2019, SAND2019-2913A, Sandia National Laboratories, Albuquerque, NM.
Sarma, R. and Brenner, I., "Hybrid Metasurfaces : From Optoelectronics to Nonlinear Optics," 2019, SAND2019-4649C, Sandia National Laboratories, Albuquerque, NM.
Sarma, R. et al., "Strong Light-Matter Interaction and Extreme Nonlinearities in Hybrid Dielectric Metasurfaces," 2019, SAND2019-4552A, Sandia National Laboratories, Albuquerque, NM.
Sarma, R. et al., "All-Dielectric Intersubband Polaritonic Metasurface with Giant Second-Order Nonlinear Response," 2019, SAND2019-15325C, Sandia National Laboratories, Albuquerque, NM.
Sarma, R. et al., "Tailored Polaritons and Nonlinearities in Hybrid Dielectric Metasurfaces," 2019, SAND2019-11178C, Sandia National Laboratories, Albuquerque, NM.
Sarma R. et al., "Tailored Strong Light-Matter Interactions and Nonlinearities in Hybrid Dielectric Metasurfaces," (poster), 2019, SAND2019-113680, Sandia National Laboratories, Albuquerque, NM.
Sarma, R. et al., "Intersubband Polaritonics in Dielectric Metasurfaces." 2019, SAND2019-15324C, Sandia National Laboratories, Albuquerque, NM.
Sarma, R. et al., "Broadband and Efficient Second-Harmonic Generation from a Hybrid Dielectric Metasurface/Semiconductor Quantum-Well Structure," 2019, SAND2019-6793J, Sandia National Laboratories, Albuquerque, NM also published as "Broadband and Efficient Second-Harmonic Generation from a Hybrid Dielectric Metasurface/Semiconductor Quantum-Well Structure," doi:10.1021/acsphotonics.9b00114. ACS Photonics 2019, 6, 6,1458-1465, publication date: May 24, 2019.
Sarma, R. et al., "Intersubband Polaritonics in Dielectric Metasurfaces," 2019, SAND2019-15163C, Sandia National Laboratories, Albuquerque, NM.
Sarma, R. et al., "Intersubband Polaritonics in Dielectric Metasurfaces." 2019, SAND2019-15162C, Sandia National Laboratories, Albuquerque, NM.
Sarma, R. et al., "Hybrid Dielectric Metasurfaces : From Strong Light-Matter Interaction to Extreme Nonlinearities," 2019, SAND2019-6795A, Sandia National Laboratories, Albuquerque, NM.
Sarma, R. et al., "A Hybrid Dielectric-Semiconductor Metasurface for Efficient Second-Harmonic Generation with Increased Bandwidth," 2018, SAND2018-4365A, Sandia National Laboratories, Albuquerque, NM.
Sarma, R. et al., "A Hybrid Dielectric-Semiconductor Metasurface for Efficient Second-Harmonic Generation," 2018, SAND2018-8723C, Sandia National Laboratories, Albuquerque, NM.
Sarma, R. et al., "A Hybrid Dielectric-Semiconductor Metasurface for Efficient Second-Harmonic Generation," 2018, SAND2018-4974A, Sandia National Laboratories, Albuquerque, NM.
Nookala, N. et al., "Mid-Infrared Second-Harmonic Generation in Ultra-Thin Plasmonic Metasurfaces without a Full-Metal Backplane," 2018, SAND2018-9640, Applied Physics B (2018), 124-132; doi.org/10.1007/s00340-018-7005-y.
Koshelev, K. et al., "Individual Nanoantennas Empowered by Bound States in the Continuum for Nonlinear Photonics," Arxiv: 1908.09790 (2019).
Krasnok, A. et al., "Nonlinear Metasurfaces: A Paradigm Shift in Nonlinear Optics," Materials Today, 2019, vol. 21, pp. 8-21.
Brener, I. et al., "Dielectric Metamaterials: Fundamentals, Designs, and Applications," Woodhead Publishing, 2019, Chapter 8, pp. 223-248.
Wolf, O. et al., "Phased-Array Sources Based on Nonlinear Metamaterial Nanocavities," Nature Communications, 2015, vol. 6, 7667, 6 pages.
Tymchenco, M. et al., "Gradient Nonlinear Pancharatnam-Berry Metasurfaces," Physical Review Letters, 2015, vol. 115, pp. 207403-1-207403-5.
Nookala, N. et al., "Ultrathin Gradient Nonlinear Metasurface with a Giant Nonlinear Response," Optica, 2016, vol. 3, pp. 283-288.
Wang, L. et al., "Nonlinear Wavefront Control with All-Dielectric Metasurfaces," Nano Letters, 2018, vol. 18, pp. 3978-3984.
Kivshar, Y., "All-Dielectric Meta-Optics and Non-Linear Nanophotonics," National Science Review, 2018, vol. 5, pp. 144-158.
Liu, S. et al., "Resonantly Enhanced Second-Harmonic Generation Using III-V Semiconductor All-Dielectric Metasurfaces," Nano Letters, 2016, vol. 16, pp. 5426-5432.
Liu, S. et al., "III-V Semiconductor Nanoresonators—A New Strategy for Passive, Active, and Nonlinear All-Dielectric Metamaterials," Advanced Optical Materials, 2016, vol. 4, pp. 1457-1462.
Liu, S. et al., "An All-Dielectric Metasurface as a Broadband Optical Frequency Mixer," Nature Communication, 2018, vol. 9, 2507.
Camacho-Morales, R. et al., "Nonlinear Generation of Vector Beams From AlGaAs Nanoantennas," Nano Letters, 2016, vol. 16, pp. 7191-7197.
Melik-Gaykazyan, E. V. et al., "Enhanced Second-Harmonic Generation with Structured Light in AlGaAs Nanoparticles Governed by Magnetic Response1," JETP Letters, 2019, vol. 109, pp. 131-135.
Vabishchevich, P.P. et al., "Enhanced Second-Harmonic Generation Using Broken Symmetry III-V Semiconductor Fano Metasurfaces," ACS Photonics, 2018, vol. 5, pp. 1685-1690.
Liu, Z. et al., "High-Q Quasibound States in the Continuum for Nonlinear Metasurfaces," Physical Review Letters, 2019, vol. 123, pp. 253901-1-253901-6.
Koshelev, K. et al., "Subwavelength Dielectric Resonators for Nonlinear Nanophotonics," Science, 2020, vol. 367, pp. 288-292.
Anthur, A. P. et al., "Continuous Wave Second Harmonic Generation Enabled by Quasi-Bound-States in the Continuum on Gallium Phosphide Metasurfaces," Nano Letters, 2020, vol. 20, pp. 8745-8751.
Marino, G. et al., "Harmonic Generation with Multi-Layer Dielectric Metasurfaces," Nanophotonics, 2021, 7 pages.
Carletti, L. et al., "Enhanced Second-Harmonic Generation from Magnetic Resonance in AlGaAs Nanoantennas," Optics Express, 2015, vol. 23, pp. 26544-26550.
Capasso, F. et al., "Coupled Quantum Well Semiconductors with Giant Electric Field Tunable Nonlinear Optical Properties in the Infrared," IEEE Journal of Quantum Electronics, 1994, vol. 30, pp. 1313-1326.
Lee, J. et al., "Giant Nonlinear Response from Plasmonic Metasurfaces Coupled to Intersubband Transitions," Nature, 2014, vol. 511, 7 pages.
Lee, J. et al., "Ultrathin Second-Harmonic Metasurfaces with Record-High Nonlinear Optical Response," Advanced Optical Materials, 2016, vol. 4, pp. 664-670.
Wolf, O. et al., "Enhanced Optical Nonlinearities in the Near-Infrared Using III-Nitride Heterostructures Coupled to Metamaterials," Applied Physics Letters, 2015, vol. 107, pp. 151108-1-151108-5.
Nevou, L. et al., "Intersubband Resonant Enhancement of Second-Harmonic Generation in GaN/AlN Quantum Wells," Applied Physics Letters, 2006, vol. 89, pp. 151101-1-151101-3.
Laffaille, P. et al., "Intersubband Polaritons at A ~ 2 µm in the InAs/AlSb System," Applied Physics Letters, 2018, vol. 112, pp. 201113-1-201113-4.

(56) References Cited

OTHER PUBLICATIONS

Rosencher, E. et al., "Quantum Engineering of Optical Nonlinearities," Science, 1996, vol. 271, pp. 168-173.
Rosencher, E. "Towards Integrated Semiconductor Optical Parametric Oscillators," Comptes Rendus de 'Academie des Sciences—Series IV-Physics, 2000, vol. 1, pp. 615-625.
Santiago-Cruz, T. et al., "Spontaneous Parametric Down-Conversion from Resonant Metasurfaces," 2021, https://.arxiv.org/abs/2103.08524v1 [physics.optics], 20 pages.
Tokman, M. et al., "Purcell Enhancement of the Parametric Down-Conversion in Two-Dimensional Nonlinear Materials," APL Photonics, 2019, vol. 4, pp. 034403-1-034403-8.
Dini, D. et al., "Microcavity Polariton Splitting of Intersubband Transitions," Physical Review Letters, 2003, vol. 90, pp. 116401-1-116401-4.
Gomez-Diaz, J. S. et al., "Nonlinear Processes in Multi-Quantum-Well Plasmonic Metasurfaces: Electromagnetic Response, Saturation Effects, Limits, and Potentials," Physical Review B, 2015, vol. 92, pp. 125429-1-125429-13.
Sarma, R. et al., "Control of Second-Harmonic Generation in Dielectric Polaritonic Metasurfaces Using X(2) Polarity Switching," 2021, CLEO, Optical Society of America 2 pages.

\* cited by examiner ions may be up

EFFICIENT ULTRATHIN ALL-DIELECTRIC NONLINEAR OPTICAL DEVICE

CROSS-REFERENCE TO RELATED APPLICATION

This application claims the benefit of U.S. Provisional Application No. 63/031,731, filed May 29, 2020, the entirety of which is hereby incorporated herein by reference.

ACKNOWLEDGEMENT OF GOVERNMENT SUPPORT

This invention was made with United States Government support under Contract No. DE-NA0003525 between National Technology & Engineering Solutions of Sandia, LLC and the United States Department of Energy/National Nuclear Security Administration. The United States Government has certain rights in this invention.

FIELD OF THE INVENTION

This invention relates to optical metamaterials, and more particularly to metasurfaces that produce nonlinear optical effects.

ART BACKGROUND

A metamaterial is a material that has been engineered to exhibit new properties that its constituents do not exhibit in bulk form. These properties may relate to responses to oscillatory stimuli, as may be encountered in optics or acoustics. A typical metamaterial is assembled from many individual elements arranged in a repeating pattern with a period comparable to, or smaller than, the wavelength of the stimulating signal. For optical applications in particular, the repeating elements may be disposed in a planar array. A metamaterial in such a conformation is referred to here as a metasurface.

Optical metasurfaces are of great interest because of their potential for enabling ultrathin optical components, among other things. Optical components of interest in this regard include flat lenses, wave plates, polarizers, and nonlinear optical frequency converters.

Some optical metasurfaces are plasmonic. These structures are metal-dielectric composites. In plasmonic metasurfaces, the interaction with an incident electromagnetic wave creates surface plasmon polaritons that propagate along a metal-dielectric interface.

Although useful, plasmonic metasurfaces tend to be intrinsically lossy at optical frequencies. Moreover, they tend to have low optical damage thresholds, which can limit their use at the high laser fluences necessary for exciting second-order nonlinear optical effects.

Alternative optical metasurfaces have been developed that are all-dielectric. For example, U.S. Pat. No. 10,128,387, the entirety of which is hereby incorporated herein, describes an all-dielectric, optically resonant metasurface formed in a direct bandgap semiconductor such as a III-V semiconductor. Each of the repeating elements is conformed as a dielectric resonator exhibiting a Mie resonance.

As is well known in the art, a Mie resonator will couple strongly to incident electromagnetic plane waves if the spatial dimensions of the resonator are comparable to the wavelength of the incident radiation. For low order Mie resonances, the spatial dimensions of the resonators will generally be smaller than the incident vacuum wavelength. For higher order Mie resonances, the dimensions may be up to several wavelengths, or more.

Dielectric metasurfaces offer advantages because, among other reasons, they have low losses and high optical damage thresholds, relative to plasmonic metasurfaces. This makes them very attractive candidates for use in nonlinear optical devices, where loss can be detrimental and pump beams need to be intense.

Dielectric metasurfaces have been considered for use in nonlinear second harmonic (SH) generation. Currently proposed designs are based on III-V semiconductor materials such as gallium arsenide (GaAs), aluminum gallium arsenide (AlGaAs), or the combination GaAs/AlGaAs. These materials have relatively large values of the bulk second order nonlinear susceptibility $\chi^2(2\omega)$; this coefficient can reach values on the order of 100 pm/V.

The nonlinear response of such materials cannot be significantly engineered. Hence, other strategies have been attempted for increasing the SH generation efficiency. One of these strategies has been to design the dielectric resonators to have high-quality-factor modes such as Fano modes. Another strategy has been to utilize quasi-bound states in continuum. Although some benefit has been realized, however, these approaches have only increased the SH generation efficiency to about $10^{-3}$ mW/W$^2$.

Accordingly, there remains a need for new nonlinear optical devices that can achieve high conversion efficiencies without suffering the disadvantages of plasmonic metasurfaces.

SUMMARY OF THE INVENTION

In this work, we demonstrate an alternative approach to dielectric nonlinear metasurface design that utilizes a polaritonic dielectric metasurface. Our approach is all-dielectric, so the polaritons that we excite are not surface plasmon polaritons. Instead, they are intersubband cavity polaritons.

An intersubband cavity polariton arises from the mixing of an electronic intersubband transition with a resonance in an optical resonator. A characteristic signature of an intersubband polariton is an energy anticrossing, with a separation in energy referred to as the vacuum-Rabi splitting. This phenomenon may be manifested in a spectrum of the cavity resonance, for example, as a splitting of a single resonance peak into two sub-peaks.

More specifically, we have coupled engineered resonant second order nonlinearities with Mie modes in dielectric resonators. Our engineered resonant second order nonlinearity is a doubly resonant nonlinearity that arises from two intersubband transitions (ISTs) equally spaced in energy in coupled quantum wells (QWs) embedded within each Mie resonator.

In a proof-of concept experimental trial of our approach, we measured a maximum second-harmonic conversion coefficient of 0.5 mW/W$^2$, and we measured a maximum second-harmonic power conversion efficiency of 0.015% at a peak pump intensity of only 11 kW/cm$^2$.

This empirically measured power conversion efficiency is lower than the actual conversion efficiency (which is at least four times higher). This is because the optics used for the experiment did not collect the entire second-harmonic generated signal. Nevertheless, the measured efficiency of 0.015% is comparable to the high conversion efficiencies reported for IST-coupled plasmonic metasurfaces as reported, e.g., in J. Lee et al., "Ultrathin second-harmonic metasurfaces with record-high nonlinear optical response" Adv. Opt. Mater. 4, 664 (2016), cited below as "Lee 2016".

Accordingly, the invention in a first aspect relates to an apparatus in which a plurality of all-dielectric resonator bodies is disposed on a substrate surface. The resonator bodies are each conformed to resonate with a first or higher order Mie resonance which has strong normal components of electric field at a pump optical frequency f. For efficient generation of second-harmonic, each resonator body should also have higher order Mie resonances at a second harmonic optical frequency 2f. However, it may be sufficient, for at least some purposes, if there is a measurable resonant response at 2f but conformation of the resonator body has not been optimized for the higher order Mie resonances, and if, instead, the higher order optical resonances are incidental to a design directed to the first Mie resonance only. However, better performance is expected if the resonator conformation is jointly optimized to support both the first and higher order optical resonances at f and 2f respectively.

Each of the resonator bodies comprises a quantum well heterostructure with a compositional profile that gives rise to at least a first-order electronic intersubband transition and a higher-order, exemplarily a second-order, electronic intersubband transition. By "first-order" and "second-order" is meant that given electronic states <1>, <2>, and <3> of the heterostructure, in order of increasing energy, the transition <1>→<3> is "second order" and the transitions <1>→<2> and <2>→<3> are "first order" if state <3> is accessible in stepwise fashion by combining transitions <1>→<2> and <2>→<3>.

Higher orders, such as third-order, are defined in similar fashion.

The first-order transition coincides, at least in part, with the first Mie resonance, and the second-order transition coincides, at least in part, with the higher order Mie resonances. In some embodiments, the second-order transition corresponds to a sequence of two first-order transitions of the quantum-well heterostructure of substantially equal transition energies.

Embodiments of the invention thus relate to apparatus comprising a metasurface in which a plurality of elements is disposed on a substrate surface. In such metasurface, each of the elements is an all-dielectric resonator body conformed to resonate at a first resonant frequency, has at least some resonant response at a second resonant frequency that is a multiple of the first resonant frequency, and includes at least one multiple quantum well (MQW) structure constituted by a sequence of layers that defines multiple quantum wells. Each MQW structure comprises at least one coupled quantum well (coupled QW) in which two or more dissimilar quantum wells are disposed sequentially. Each of the coupled QWs is dimensioned to have at least a first, a second, and a third electronic eigenstate having respective energy levels mutually separated by transition energies corresponding to respective optical transition frequencies. The abovesaid first resonant frequency of the resonator bodies is substantially equal to one of the optical transition frequencies, and the second abovesaid resonant frequency is substantially equal to another of the optical transition frequencies.

Herein, energy levels or separations between energy levels are "substantially equal" if they are equal to within plus or minus 10%.

In some embodiments, the first optical resonance is a fundamental Mie resonance of the all-dielectric resonator bodies. In some embodiments, the first optical resonance is a magnetic dipole resonance or a magnetic quadrupole resonance of the all-dielectric resonator bodies.

In embodiments, the resonator bodies are disposed in a repeating pattern on the substrate surface.

In embodiments, each of the resonator bodies comprises III-V semiconductor material. For example, each of the quantum well heterostructure in particular embodiments is an InGaAs/AlInAs heterostructure. In some embodiments, each of the resonator bodies comprises Group-III antimonide material. In some embodiments, each of the quantum well heterostructures is an AlSb/InAs/AlSb heterostructure.

In embodiments, each of the quantum well heterostructures is a coupled quantum well heterostructure.

In embodiments, the harmonic frequency 2f lies within the mid-wave infrared region from a vacuum wavelength of 1.5 µm to a vacuum wavelength of 4 µm.

In a second aspect, the invention relates to a method of second-harmonic generation by impingement of a pump beam of optical frequency f on a plurality of all-dielectric resonator bodies so as to excite optical Mie modes at frequencies f in the resonator bodies. Concurrently with the excitation of the optical resonances, the impingement of the pump beam also excites resonant second-order nonlinearities in the resonator bodies, whereby second-harmonic light is emitted from them.

The method further includes collecting the emitted second-harmonic light. According to embodiments of the invention, the resonant second-order nonlinearities are attributable to quantum well heterostructures embedded within the resonator bodies, and the resonant second-order nonlinearities are coupled to the Mie modes such that the second-harmonic light is produced by cavity-mode polaritons that subsist within the resonator bodies during the impingement of the pump beam.

Embodiments of the invention thus relate to a method for generating harmonic light from a pump beam, in which the pump beam is impinged on a metasurface comprising a plurality of all-dielectric resonator bodies, such that a Mie resonance is excited in each of the said bodies, and in which harmonic light having a frequency that is a multiple of the pump frequency is collected from the metasurface.

According to such method, the impinging of the pump beam excites a fundamental intersubband transition (IST) of MQW heterostructures contained within the said bodies, wherein the fundamental IST is coupled to a Mie resonance supported by the said bodies.

Further, the impinging of the pump beam also excites at least one higher-order IST of the said MQW heterostructures, wherein the higher-order IST has a transition frequency that overlaps at least one Mie-resonant response of the said bodies having a frequency that is a harmonic of the pump frequency.

BRIEF DESCRIPTION OF THE DRAWINGS

FIG. 3 also shows three wavefunctions superimposed on the energy-band diagram.

DETAILED DESCRIPTION

Figure 1:
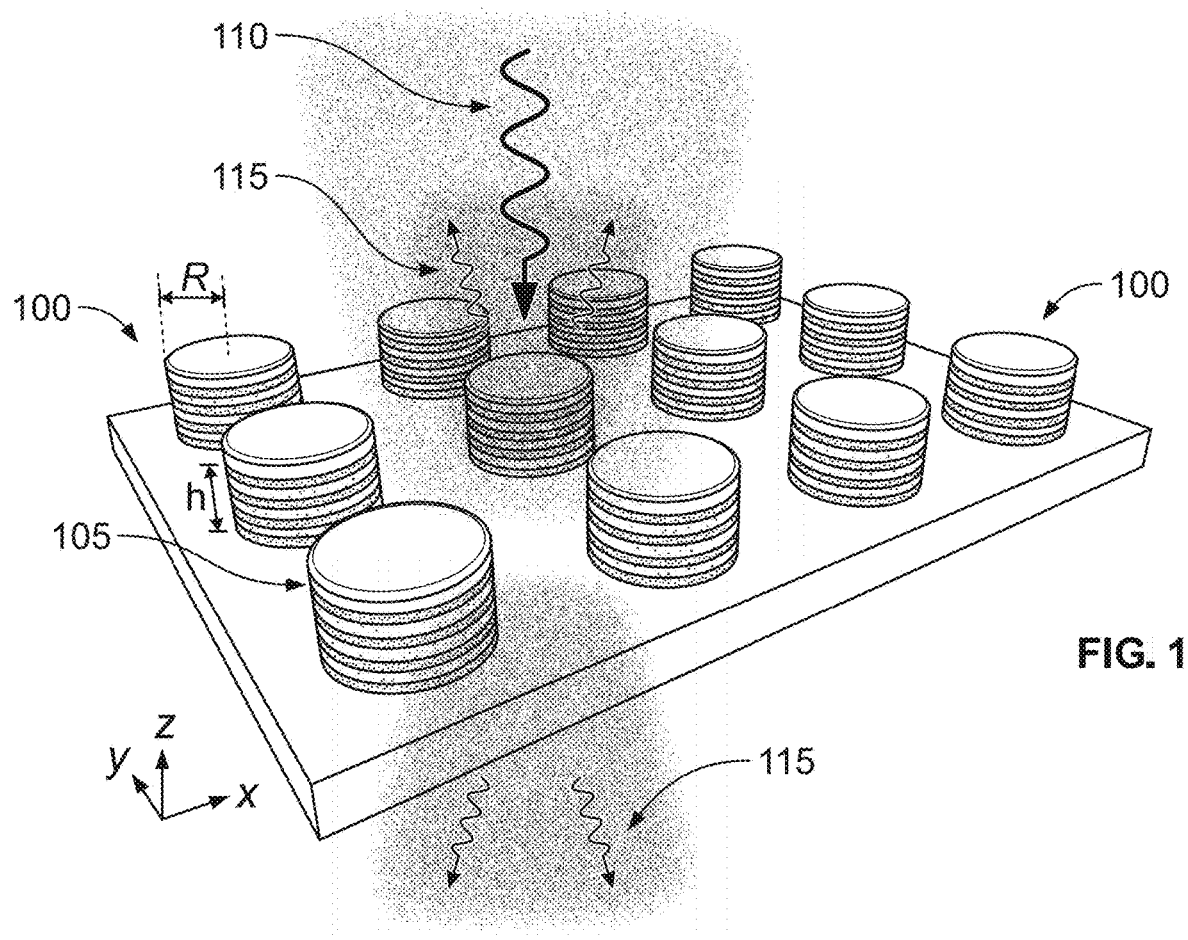
FIG. 1 is a notional drawing, in perspective view, showing an example metasurface in operation for generating second-harmonic light.

In embodiments of the invention, multi-quantum-well (MQW) semiconductor heterostructures are embedded within all-dielectric Mie resonators in a metasurface. The embedded MQW heterostructures are designed to support intersubband transitions (ISTs). Accordingly, the physical response of each of the resulting resonator structures has two coupled components: A spectral component associated with the ISTs, and an optical, or photonic, component associated with the Mie resonances.

A "Mie resonator", in this regard, is an optical resonator having at least one spatial dimension that is comparable to or smaller than the vacuum wavelength of light at some fundamental resonant optical frequency. "Mie resonance" is a general term for an optical resonance that is supported by the resonator at such a fundamental frequency or at one of its higher harmonics that correspond to shorter wavelengths. These resonances are what we refer to here as Mie resonances or "Mie modes", where the lowest order (smallest frequency) is the magnetic dipole Mie mode, and second-order modes are the quadrupole modes.

In operation, polaritonic coupling of the ISTs to the Mie modes can result in high conversion factors for second-harmonic generation, and in some cases it can also produce third-harmonic generation and other higher-order nonlinear effects. In examples, conversion factors of 0.5 mW/W$^2$ or even more may be achievable using the lowest-order magnetic dipole Mie mode of the resonator, or using the second-order magnetic quadrupole Mie mode.

The metasurface is operated by impinging it with a pump beam. No special polarization of the pump beam is required. In particular, any polarization of the electric field along the x- or y-direction of the pump beam can be effective. Moreover, the pump beam can be directed either normally or off-normally to the metasurface. It should be noted, however, that normal emission of second-harmonic light is suppressed when the pump beam is at normal incidence. That phenomenon is discussed below.

The design of the MQW heterostructure offers some control over the magnitude and sign of the second-order nonlinear susceptibility elements $\chi^{(2)}(2\omega)$. This degree of freedom, when combined with the ability to control the polarization and spatial mode profiles of all-dielectric Mie resonators, can be leveraged to further enhance the SHG efficiency using techniques similar to quasi-phase-matching.

Our experimental demonstration was at mid-infrared wavelengths, for which the example embodiments described below were designed. However, the same approach for SHG can be scaled from near-IR to longwave-IR wavelengths, using suitable combinations of material systems and quantum well designs.

In embodiments, the resonator bodies are fabricated from III-V semiconductors, and they include n-doped quantum wells (QWs). Each resonator body is conformed as a Mie resonator.

For example, we fabricated and tested metasurfaces in which each resonator body comprises an InGaAs/AlInAs quantum heterostructure.

FIG. 1 is a notional drawing in perspective view, showing an example metasurface in operation. As seen, the metasurface comprises a repeating pattern of elements 100, which in this example are arranged in a periodic array. Each of the elements is conformed as a cylindrical resonator body capped with a low-refractive-index layer 105 of silicon dioxide. A pump beam 110 is normally incident from the top, and generated second-harmonic light 115 is seen radiating in both reflection and transmission.

Figure 2:
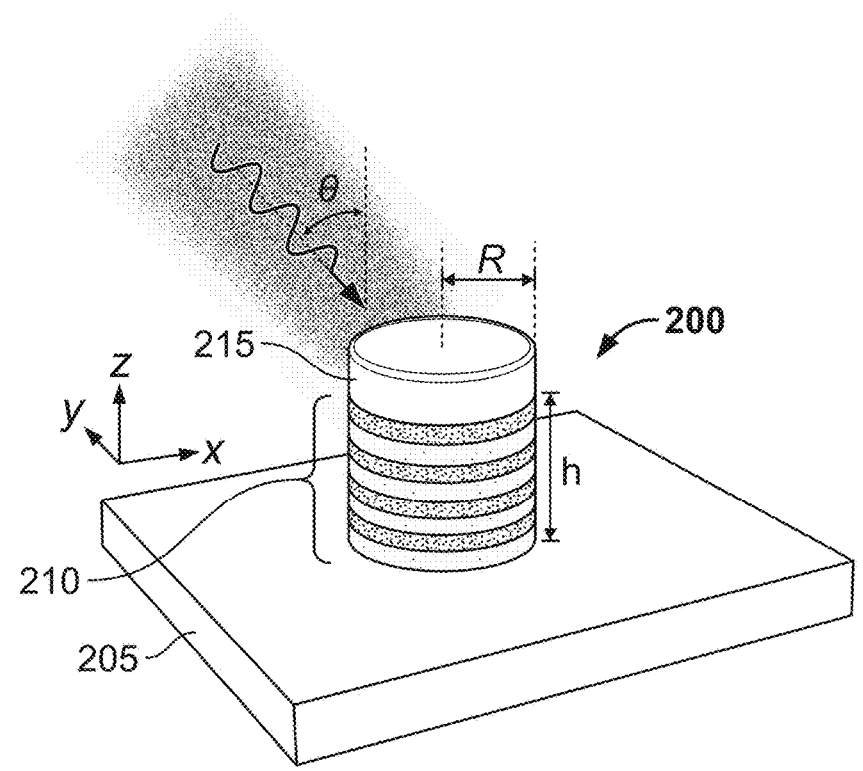
FIG. 2 is a perspective view of a single element of a metasurface in an example embodiment.

FIG. 2 is a perspective view of a single resonator element 200 on a sapphire substrate 205, similar to an example embodiment that we fabricated and tested. As indicated in the figure, the element includes a resonator body comprising an InGaAs/AlInAs quantum coupled-well heterostructure 210, with a low-refractive-index cap 215 of silicon dioxide. As also indicated in the figure, the resonator body has a height h and a radius R. The aspect ratio of the resonator body is defined as R/h.

Quantum coupled-well heterostructures are described, for example, in F. Capasso et al., "Coupled Quantum Well Semiconductors with Giant Electric Field Tunable Nonlinear Optical Properties in the Infrared," *IEEE J. Quantum Electr.* 30 (1994) 1313-1325, cited below as "Capasso 1994" and hereby incorporated herein by reference in its entirety.

Figure 3:
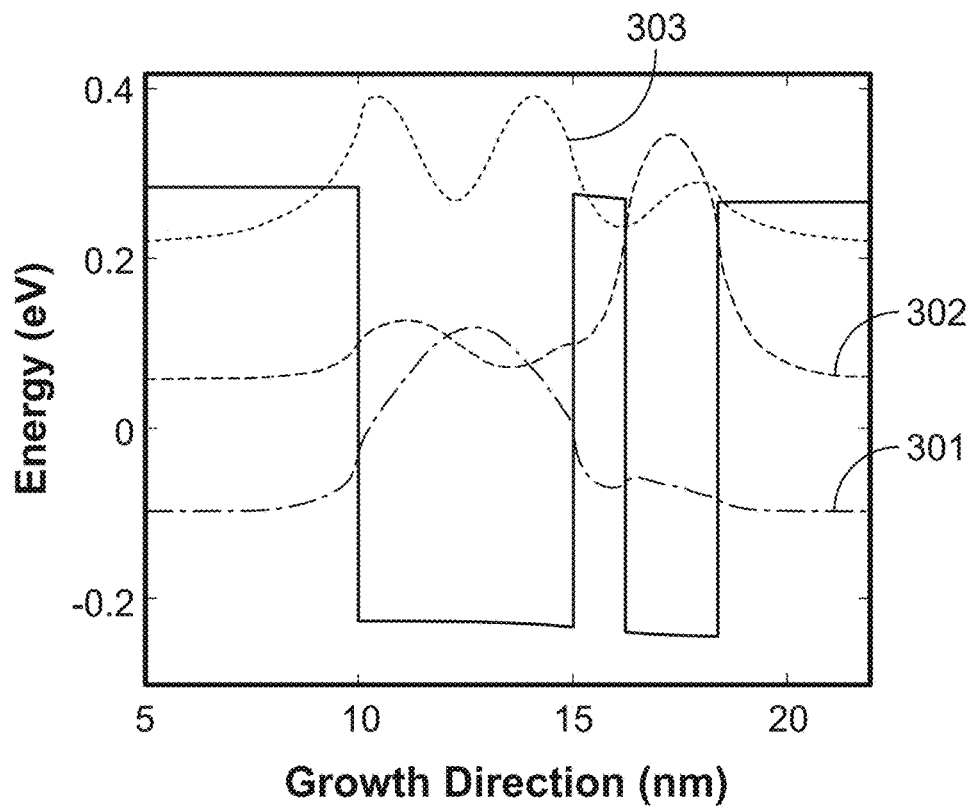
FIG. 3 is an energy-band diagram for a quantum heterostructure used in the elements of an example metasurface.

FIG. 3 is an energy-band diagram for a quantum heterostructure used in our experiments. The respective layers of this heterostructure had the composition $In_{0.53}Ga_{0.47}As/Al_{0.52}In_{0.48}As$. The thicknesses of the layers in the sequence:
$(Al_{0.52}In_{0.48}As/In_{0.53}Ga_{0.47}As/Al_{0.52}In_{0.48}As/In_{0.53}Ga_{0.47}As/Al_{0.52}In_{0.48}As)$
are 10/5/1.2/2.2/10 (all in nm). The height of the resonator element is 1.5 µm. An example aspect ratio R/h is 0.93, where R is cylinder radius and h is height.

The heterostructure was designed to have electronic intersubband transitions (ISTs) at a fundamental Mie resonance of the resonator body with a wavelength of about 7.8 µm, and also at a second harmonic of the resonator body with a wavelength of about 3.9 µm.

FIG. 3 also shows three wavefunctions 301, 302, 303 superimposed on the energy-band diagram. These are the wavefunctions for the three subbands that give rise to the intersubband transitions. The respective wavefunctions are drawn with vertical separations between them that correspond to the differences in their energy levels.

For purposes of discussion, we will now refer to the three electronic states, in order of increasing energy, as <1>, <2>, and <3>. Accordingly, the three transitions that are involved in the process of SHG are 1→2, 2→3, and 1→3, with respective dipole matrix elements $z_{12}$, $z_{23}$, and $z_{13}$. The energy difference corresponding to the 1→3 transition is $\hbar\omega_3$, where h is the reduced Planck constant.

As explained in Capasso 1994, cited above, the second-order nonlinear susceptibility is theoretically predicted by the equation $$\chi^{(2)}(2\omega) = \frac{e^3}{\varepsilon_0} N \cdot \frac{\langle z_{12}\rangle\langle z_{23}\rangle\langle z_{31}\rangle}{(2\hbar\omega - \hbar\omega_{13} - i\Gamma_{13})},$$

where e is the electronic charge, $\varepsilon_0$ is the permittivity of free space, N is the electron density in the quantum wells, and $\Gamma_{13}$ is the half width at half-maximum of the 1→3 transition.

One feature of Mie resonances that is favorable to SHG and other nonlinear phenomena is that at resonance, certain components of the electromagnetic field internal to the resonator are enhanced in value, relative to the incident field. Accordingly, a field enhancement $f_p$ is defined by the expression $f_p = |E_z/E_{incident}|$, where $E_{inc}$ is the amplitude of the electric field at the pump wavelength in the incident wave, and $E_z$ is the electric field component on the axis normal to the metasurface (i.e., normal to the growth direction), which by convention is taken to be the z-axis. The z-directed field enhancement is important because quantum selection rules dictate that only photonic modes with $E_z$ components can couple to the ISTs.

The SHG efficiency is proportional to the quantity $|\chi_{zzz}^{(2)} f_p^2|^2$, where $f_p$ is defined above, and $\chi_{zzz}^{(2)}$ is the (z,z,z) tensor element of the susceptibility $\chi^{(2)}(2\omega)$. For that reason, it is advantageous to engineer the Mie modes of the resonators to satisfy two conditions: (1) an efficient coupling of the incident pump light to the ISTs; and (2) a maximized volume-integrated product of xml and the field enhancement.

To simultaneously satisfy both conditions, the resonators in the present example were designed to support a particular mode, namely, the lowest-order magnetic dipole (MD) mode (or, alternatively, the second-order magnetic quadrupole mode) at a wavelength slightly detuned from the fundamental IST wavelength of 7.8 µm, but still within the linewidth of the IST resonance. The IST resonance linewidth can be inferred from the experimentally measured normalized transmission spectrum of the multi-QW stack.

Figure 4:
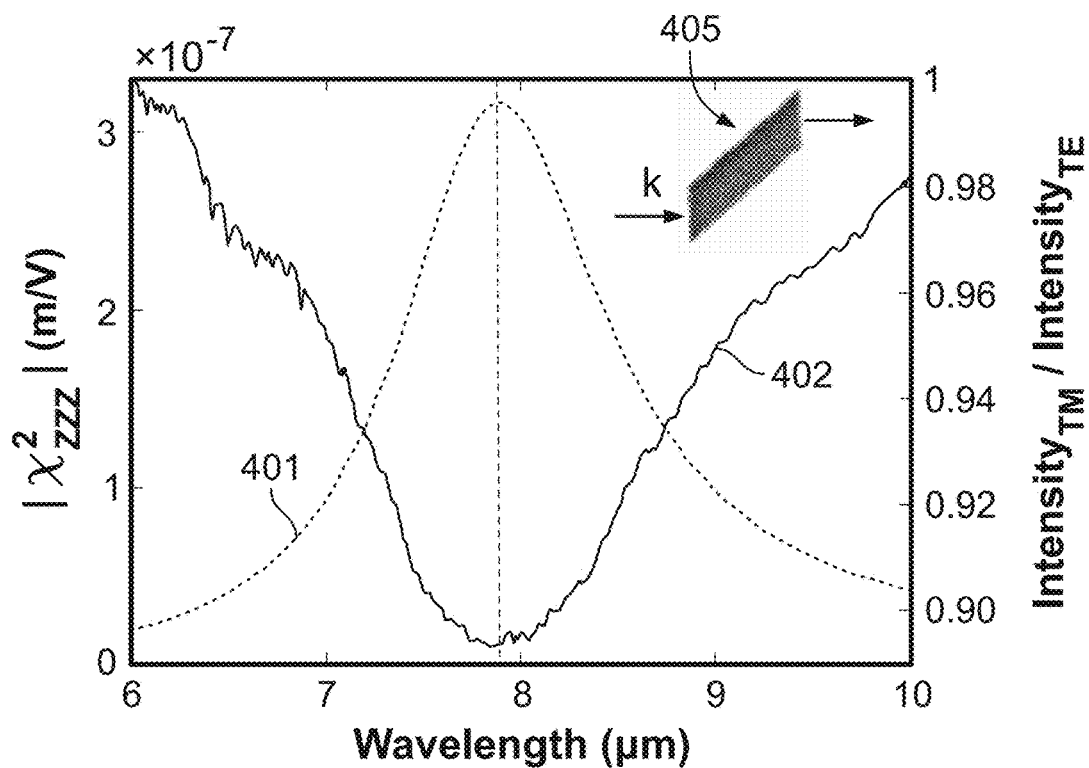
FIG. 4 presents a graph of the numerically calculated value of the intersubband nonlinear susceptibility of a multi-QW structure as a function of the pump wavelength. Also presented on the same graph is an experimentally measured intersubband absorption spectrum of multi-QW heterostructures discussed here. An inset shows the waveguide configuration used for the absorption measurements with the input direction k indicated.

For example, FIG. 4 presents a graph obtained from numerical modeling of our example MQW structure. Plotted on the left-hand scale is the intersubband nonlinear susceptibility 401 of the MQW structure as a function of the pump wavelength. In addition, we plotted on the right-hand scale the intersubband absorption spectrum 402 that we experimentally measured on the same structure. An inset 405 in the figure shows the waveguide configuration used for the absorption measurements. The input direction k is indicated. The absorption spectrum was produced by taking the ratio between two intensity values: The intensity of the transmitted transverse magnetic (TM) polarized input light, and the intensity of the transmitted transverse electric (TE) polarized input light.

Because the MD mode has strong z-directed electric field components (due to its circulating out-of-plane electric fields), choosing the MD mode allowed us to strongly couple normally incident pump light to the ISTs. In addition, slight detuning of the MD mode with respect to the IST resonance helped to maximize $|\chi_{zzz}^{(2)} f_p^2|^2$ by reducing absorption losses. In fact, as shown in FIG. 4, the maximum of $|\chi^{(2)}|$ spectrally overlaps the maximum of the IST-induced absorption in the present example.

Figure 5:
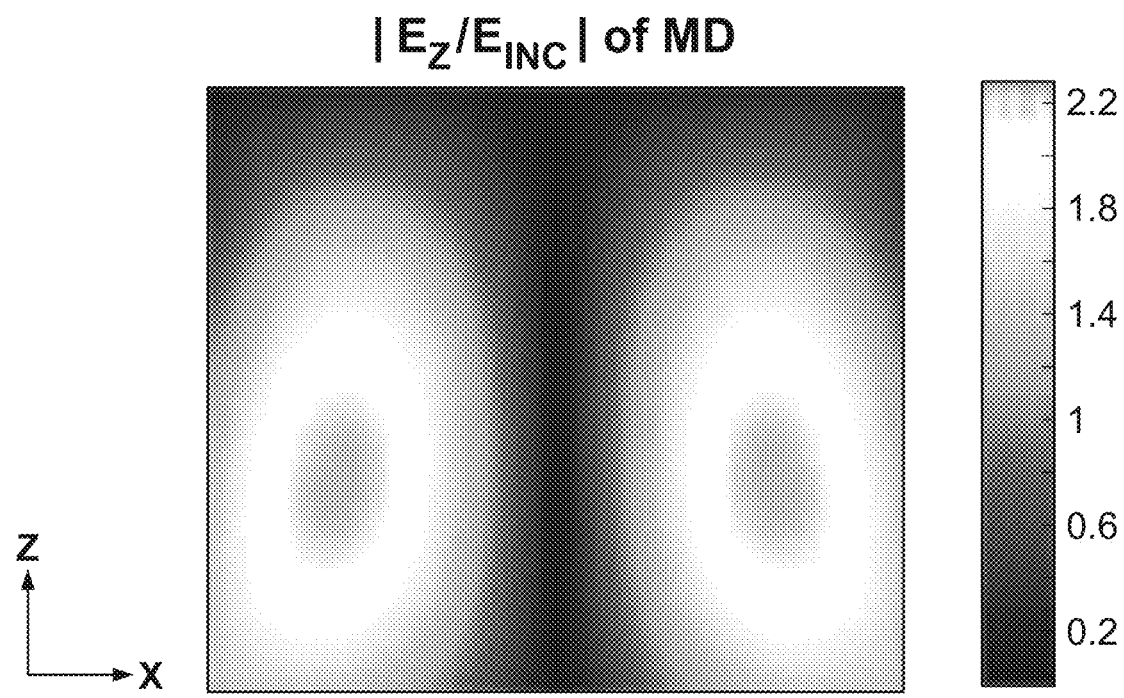
FIG. 5 is an intensity map, in the xz-plane, of numerically calculated values of $|E_z/E_{inc}|$ of the fundamental magnetic dipole resonance within a resonator body in an element of an example metasurface.

FIG. 5 provides a typical example of field enhancement. It is an intensity map, in the xz-plane, of numerically calculated values of $|E_z/E_{inc}|$ of the MD resonance of an illustrative resonator body similar to the resonator body of FIG. 2.

Thus, in example embodiments, we generated a nonlinear response by introducing polaritonic coupling at the fundamental wavelength between the MD mode and the IST. It should be noted in this regard that the MD mode has the additional advantage that it is the mode for which the resonator body can be made as small as possible. We can also achieve similar coupling for the magnetic quadrupole mode and IST, which we have also experimentally demonstrated.

It is also noteworthy that in embodiments, the height of the resonator body can be less than the vacuum wavelength of the pump light at resonance, and it can also be less than the in-material wavelength. Consequently, effective metamaterials can be made that are very thin, for example with total thicknesses that are less than twice the vacuum wavelength of the pump light.

Figure 6:
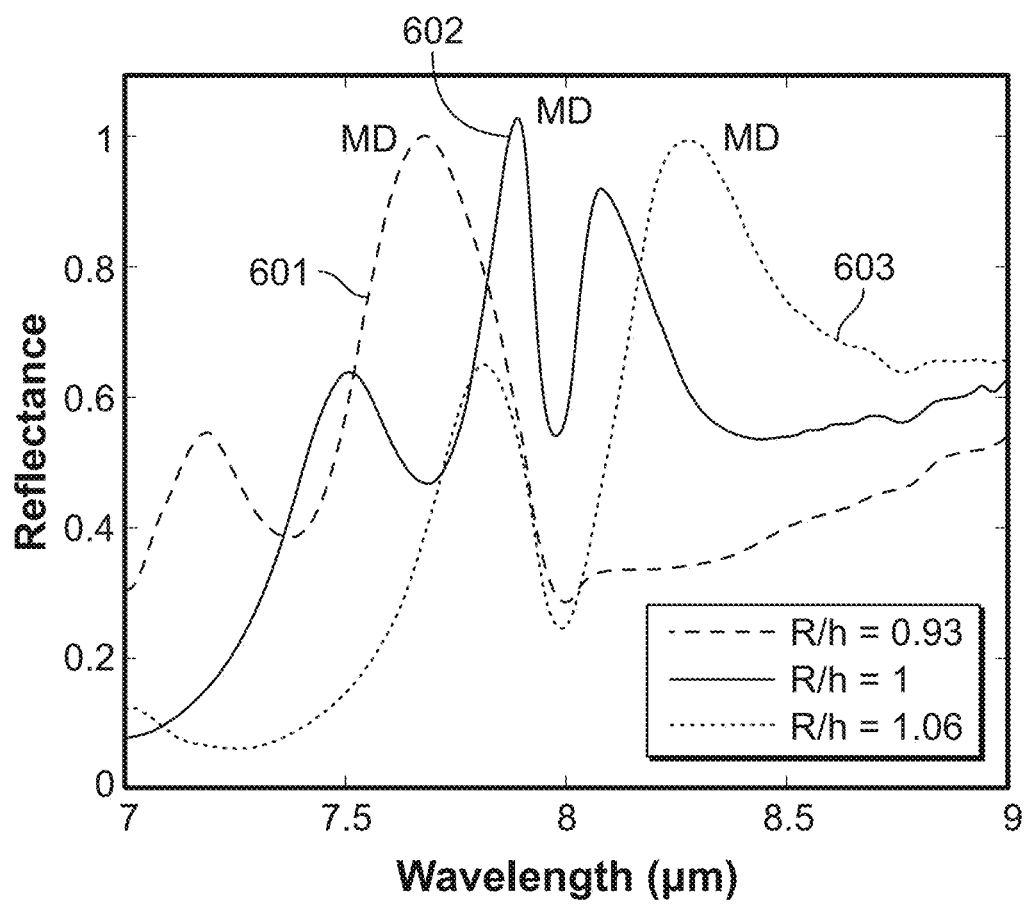
FIG. 6 shows three plots of an experimentally measured linear reflectance spectrum. From left to right, these spectra were measured on resonators with different aspect ratios due to different radii of the cylinders. The reflectance peak at the MD resonance is labeled on each of the three spectral curves and scales to longer wavelength with increasing radius.

Turning now to FIG. 6, three plots are shown of experimentally measured linear reflectance spectra. From left to right, these spectra 601, 602, 603 were measured on resonators with different aspect ratios of 0.93, 1, and 1.06 respectively. The reflectance peak at the MD resonance is labeled on each of the three spectral curves.

It can be seen in the figure that at an aspect ratio of 1, the MD peak is split. This is an indication that the MD resonance is aligned with the IST. This is an example of the vacuum-Rabi splitting that is the characteristic signature of strong coupling and formation of an intersubband polariton.

It will be evident from this example that using InGaAs/AlInAs heterostructures gives us access to a spectral range at least from 7 μm to 8 μm, and beyond, for potential second harmonic conversion. This is significant, not least because it provides a path to generating light in the mid-wave infrared region, i.e., the portion of the electromagnetic spectrum from 3 μm to 8 μm.

Example 1

Figure 7:
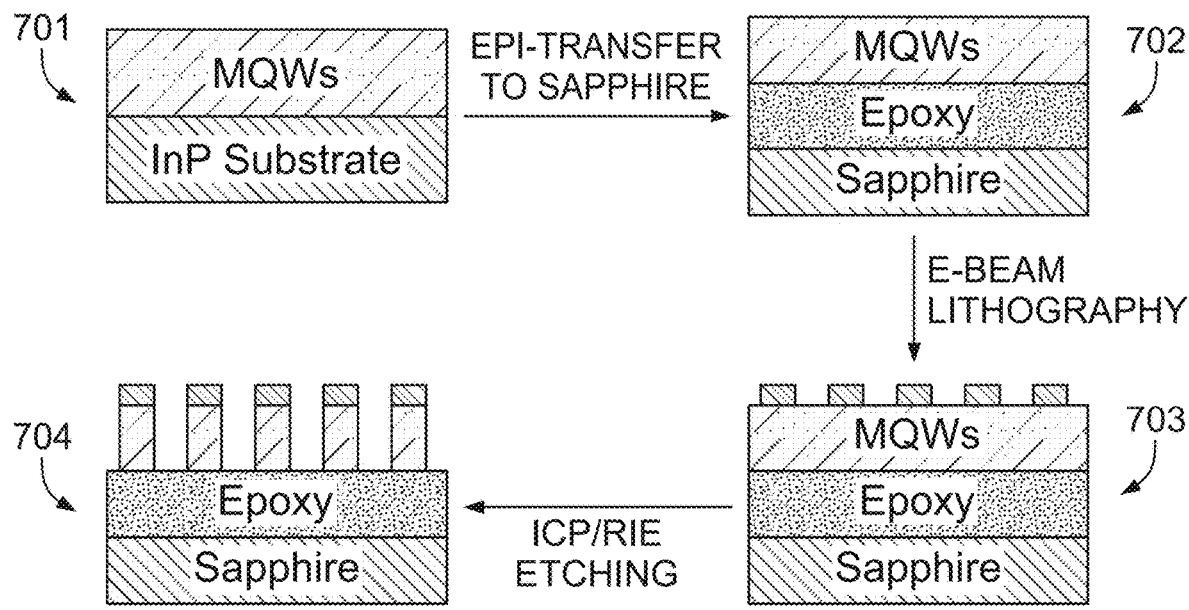
FIG. 7 is a flowchart in which cross-sectional cartoon views illustrate several sequential stages in a fabrication process for metasurfaces of the kind described here.

Fabrication. We fabricated metasurfaces substantially as described above. FIG. 7 is a flowchart in which cross-sectional cartoon views illustrate several sequential stages in our fabrication process.

As shown in the figure, a quantum heterostructure is grown epitaxially on an indium phosphide (InP) substrate (701). The substrate is flipped, and the heterostructure is adhered, topside-down, to a sapphire substrate using an epoxy adhesive (702). The InP substrate is removed by optional lapping, followed by wet etching. The cylindrical Mie resonators are then patterned using electron beam lithography (703) and defined by a combination of inductively coupled plasma etching (ICP) and reactive ion etching (RIE) (704).

More specifically, the heterostructure used in this study was grown on a semi-insulating InP substrate using molecular beam epitaxy. It comprises multiple repetitions of the asymmetric coupled $In_{0.53}Ga_{0.47}As$ QWs sandwiched between $Al_{0.52}In_{0.48}As$ barrier layers as shown in FIG. 3. The total thickness of the multi-QW stack was 852 nm. Since the minimum height of the resonator needs to be about 1.5 μm to support the lowest order MD mode, additional $Al_{0.52}In_{0.48}As$ layers were grown symmetrically on top and bottom of the multi-QW stack to make the total epilayer thickness equal to 1.5 μm. The epilayer thickness determined the height (h) of the resonators used in this study to be 1.5 μm.

After growth, the wafer was flipped and adhesively bonded to a sapphire substrate using benzocyclobutene. After bonding, the InP substrate was selectively removed to leave the epilayer on top of the sapphire substrate.

The resonators were then defined via e-beam lithography. Hydrogen silsesquioxane was used as the e-beam resist which was converted to $SiO_2$ on e-beam exposure. After development, inductively-coupled plasma reactive ion etching was used for defining and fabricating the cylinders using the $SiO_2$ layer on top of the cylinders as a mask. The $SiO_2$ was not removed after the etching and together with the sapphire substrate on the bottom, it provided the refractive index contrast needed for the resonators to support the Mie modes.

The Mie modes were spectrally scaled by changing the radius (R) of the resonators. In all the metasurfaces, the periodicity (p) of the array of the resonators along x and y was fixed to be 3R.

Figure 8:
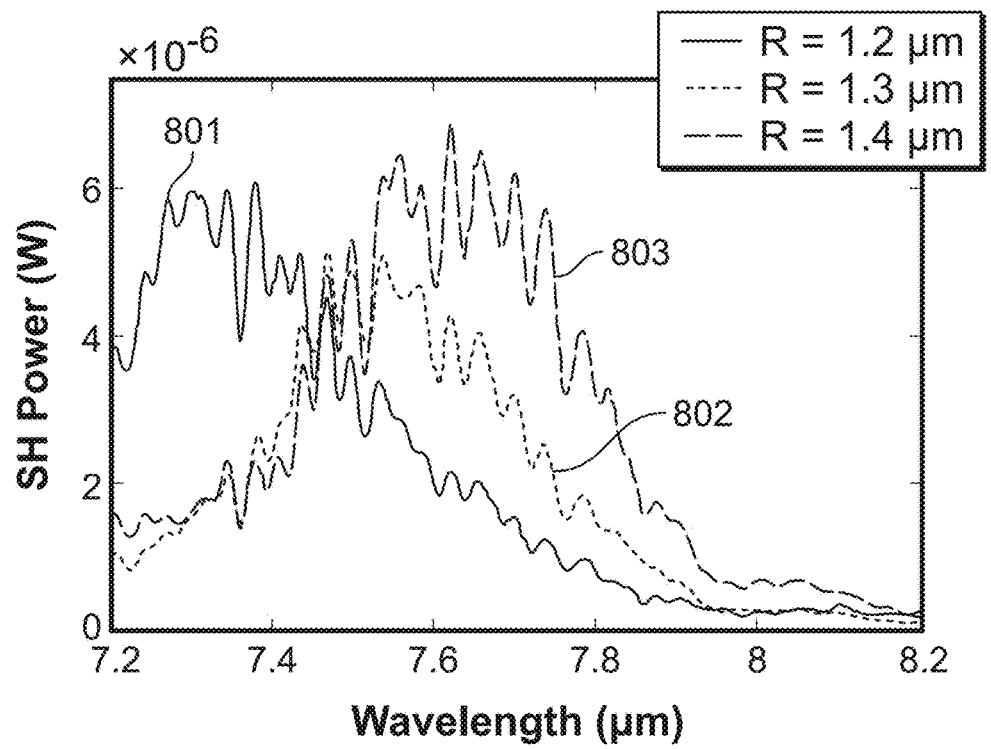
FIG. 8 is a graph of experimentally measured optical power versus pump wavelength, for the second-harmonic signal reflected from three respective Mie metasurfaces.

Experimental Results. FIG. 8 shows the experimentally measured optical power of the SH signal reflected from the Mie metasurfaces as a function of the pump wavelength. Three metasurfaces are represented in the figure, with respective cylinder radii of 1.2 μm (curve 801), 1.3 μm (curve 802), and 1.4 μm (curve 803). The cylinder height in each case was 1.5 μm.

The designed resonant wavelength of the IST in these metasurfaces was 7.8 μm. However, it is evident from the figure that the maximum SH generation efficiency occurred at an aspect ratio R/h of 0.93 and a pump wavelength of only about 7.62 μm. That is, the maximum SH generation efficiency is observed at a pump wavelength slightly shorter than the designed resonant wavelength of the IST. Without wishing to be limited by mechanism, we propose that this is because the field enhancement inside the resonators is larger at the shorter wavelengths.

Figure 9:
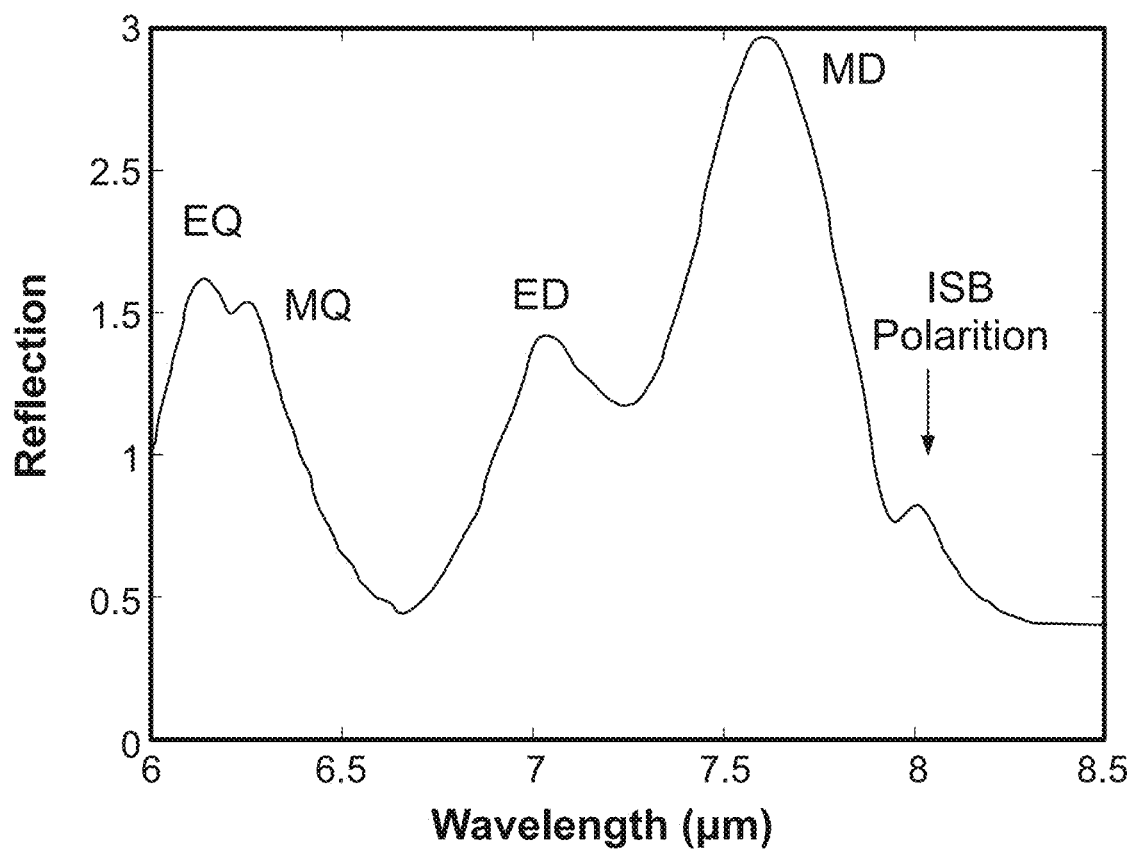
FIG. 9 is an experimentally measured linear reflectance spectrum of a metasurface with cylinders of R=1.4 µm. Rabi splitting of the MD resonance can be seen in the figure.

FIG. 9 is a graph of the experimentally measured linear reflectance spectrum of a metasurface with cylinders of R=1.4 μm. Rabi splitting of the MD resonance can be seen, indicating strong light-matter coupling between the MD resonance and the IST, leading to formation of intersubband polaritons. MD, ED, MQ, and EQ correspond to magnetic dipole, electric dipole, magnetic quadrupole, and electric quadrupole modes, respectively.

Figure 10:
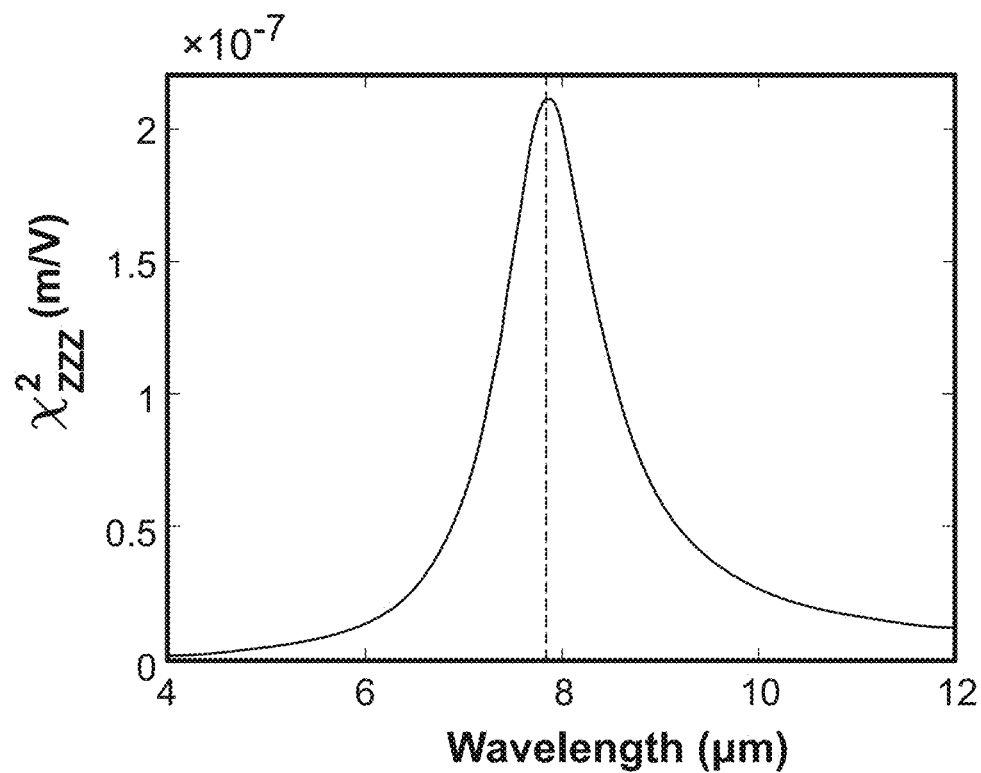
FIG. 10 is a numerically calculated graph of susceptibility plotted versus wavelength for an example metasurface of the kind described here.
Figure 11:
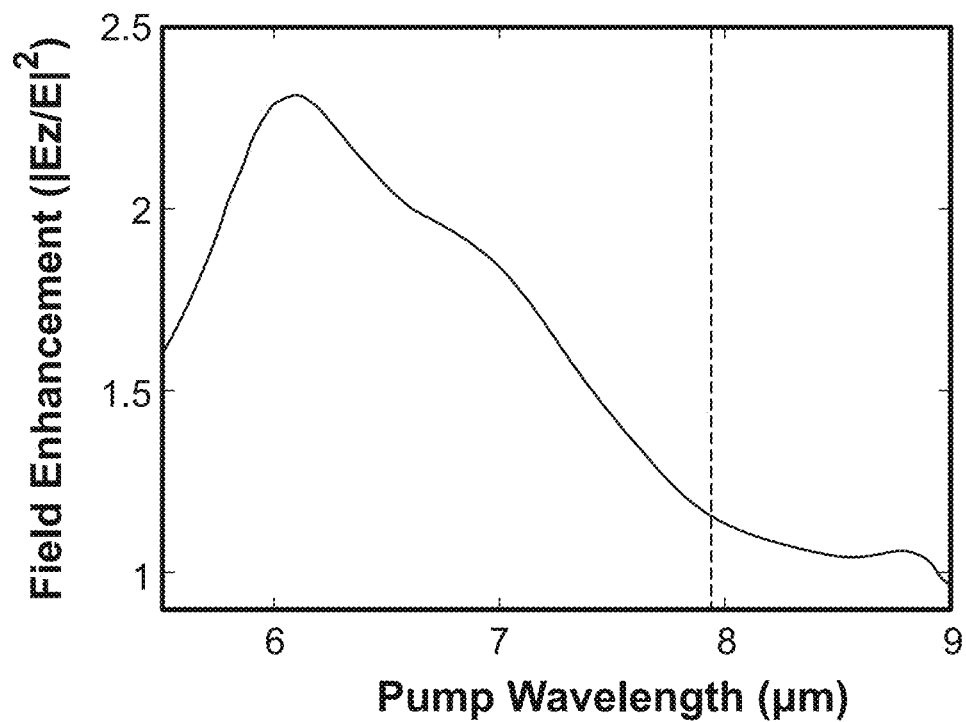
FIG. 11 is a numerically calculated graph of field enhancement plotted versus wavelength for an example metasurface of the kind described here.
Figure 12:
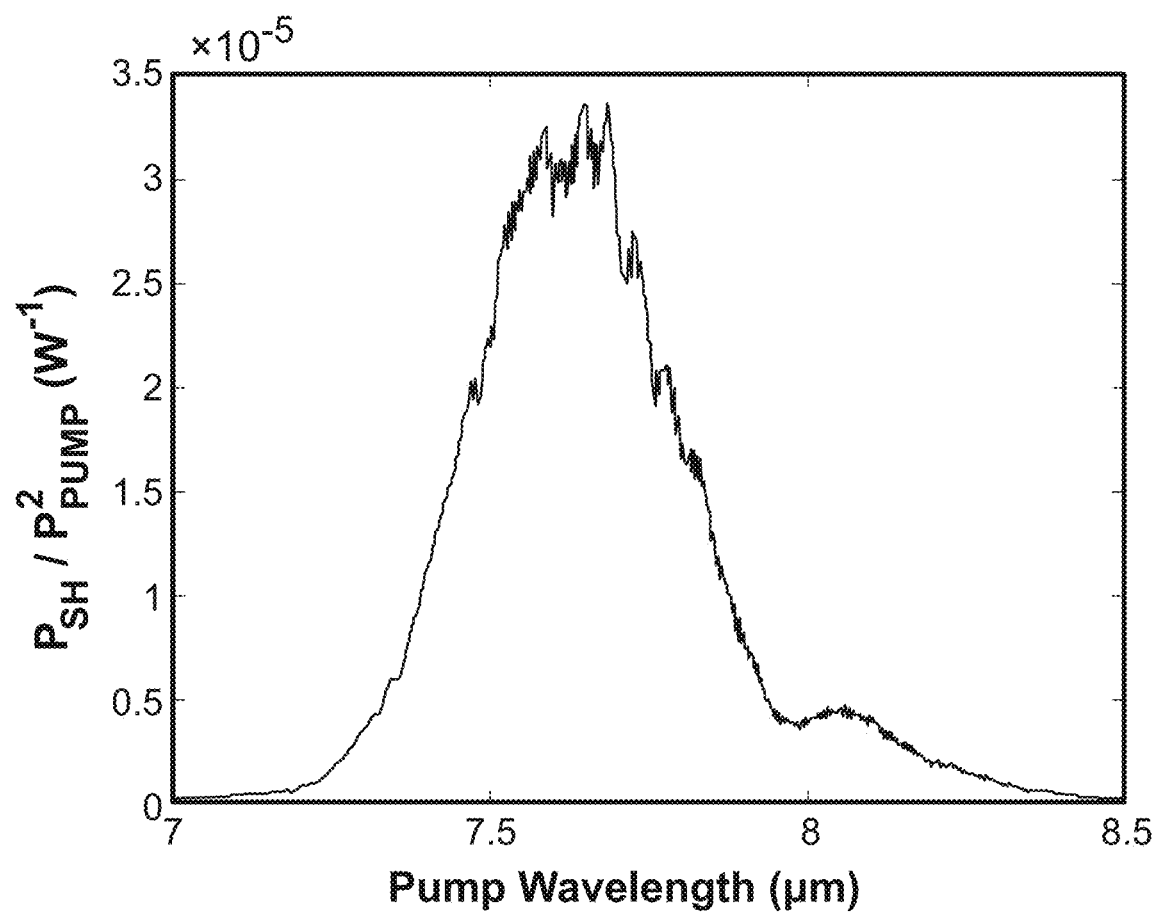
FIG. 12 is a graph of experimentally measured reflected SH power conversion efficiency as a function of pump wavelength. The measurements were for normal pump incidence on a metasurface with cylinders of R=1.4 µm.

FIGS. 10, 11, and 12 illustrate the interplay between the nonlinearity and the field enhancement.

The SHG efficiency is determined by the product of the second-order nonlinear susceptibility times the field enhancement. The numerically calculated susceptibility is plotted versus wavelength in FIG. 10. The numerically calculated field enhancement is plotted versus wavelength in FIG. 11. In FIGS. 10 and 11, a vertical black broken line indicates the designed resonant wavelength of the IST.

Although the susceptibility is maximum at 7.8 μm, the field enhancement is larger at shorter wavelengths. As a result, the maximum SHG efficiency will be shifted to a wavelength shorter than the wavelength of maximum susceptibility.

FIG. 12 is a graph of the experimentally measured reflected SH power conversion efficiency as a function of pump wavelength. The measurements were for normal pump incidence a metasurface with cylinders of R=1.4 μm. The efficiency is plotted in normalized units obtained by dividing the reflected SH power by the square of the incident pump power. Two peaks at about 7.6 μm and about 8 μm are observed, corresponding to the two polariton branches. The maximum SHG efficiency is observed at a pump wavelength of about 7.65 μm.

Figure 13:
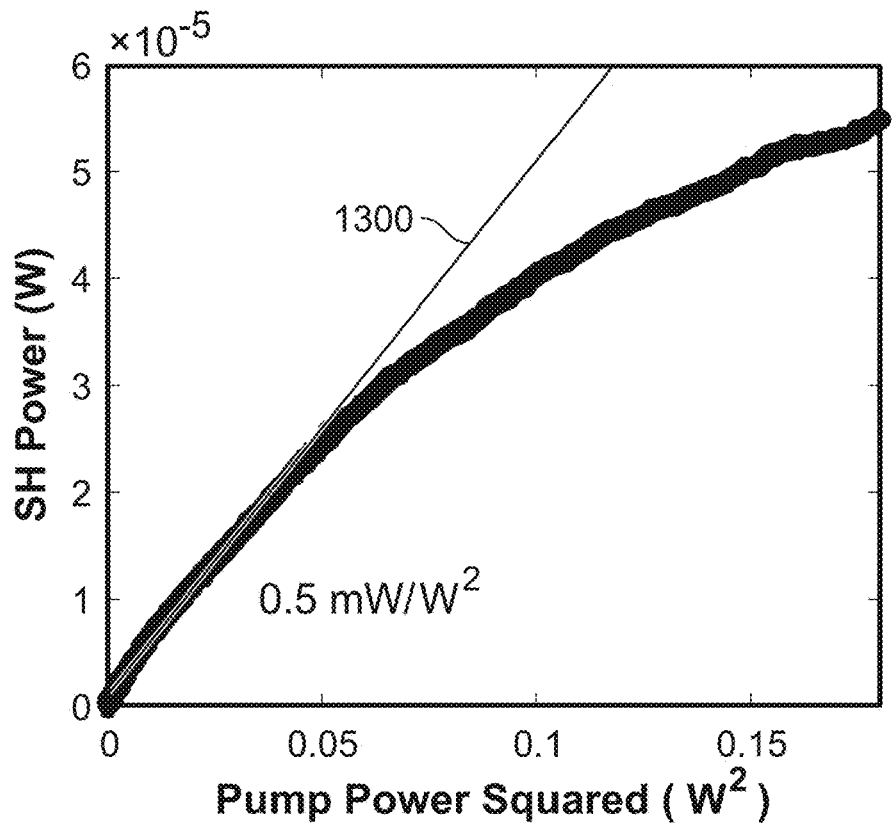
FIG. 13 is a graph illustrating the performance of an example metasurface. Reflected optical power in the second harmonic is plotted versus the square of the pump optical power. The data in the figure were from experimental measurements.

In FIG. 13, we have plotted experimental measurements of the peak reflected SH power optical power versus the square of the pump optical power for h=1.5 μm, R=1.4 μm, and a wavelength of 7.65 μm.

The second-harmonic nonlinear conversion factor can be determined from the slope of a linear fit 1300 to the curve of FIG. 13. As seen in the figure, this factor reached values as high as 0.5 $mW/W^2$.

Another figure of merit is the second-harmonic power conversion efficiency, which is defined as the ratio of second-harmonic power to pump power.

Figure 14:
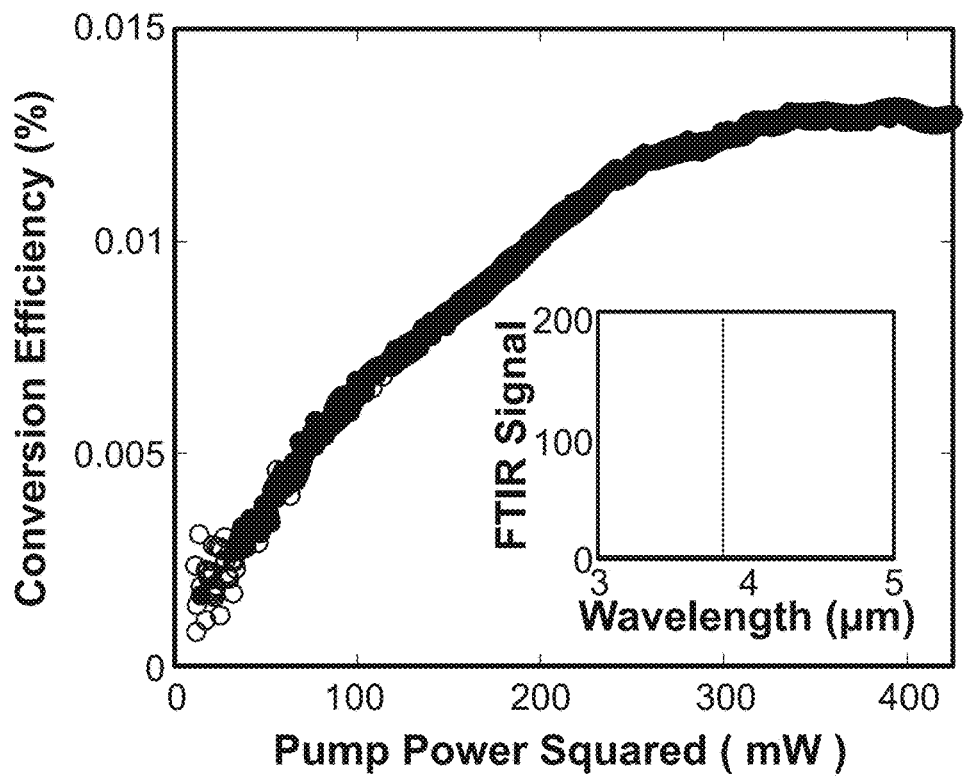
FIG. 14 is another graph illustrating the performance of an example metasurface. Experimentally measured conversion efficiency is plotted versus pump power.

FIG. 14 is a graph of the experimentally measured conversion efficiency versus incident peak pump power for the metasurface of FIG. 13. The inset shows the corresponding experimentally-measured spectrum of SH radiation. The single spectral peak at one-half the pump wavelength, confirms the SHG process.

The measurements plotted in FIGS. 13 and 14 were corrected by a factor of 4 to compensate for limited collection efficiency of our optics.

It can be seen from FIG. 14 that the maximum conversion efficiency is 0.013% at a peak pump intensity of 11 $kW/cm^2$.

As FIG. 14 shows, the effectiveness of ISTs can be limited by the saturation of the IST transition at high pump powers. However, the pump intensity at saturation can be significantly increased by detuning one of the resonances by a few percent, rather than using equally spaced electronic energy levels as in the present example.

Example 2

Figure 15:
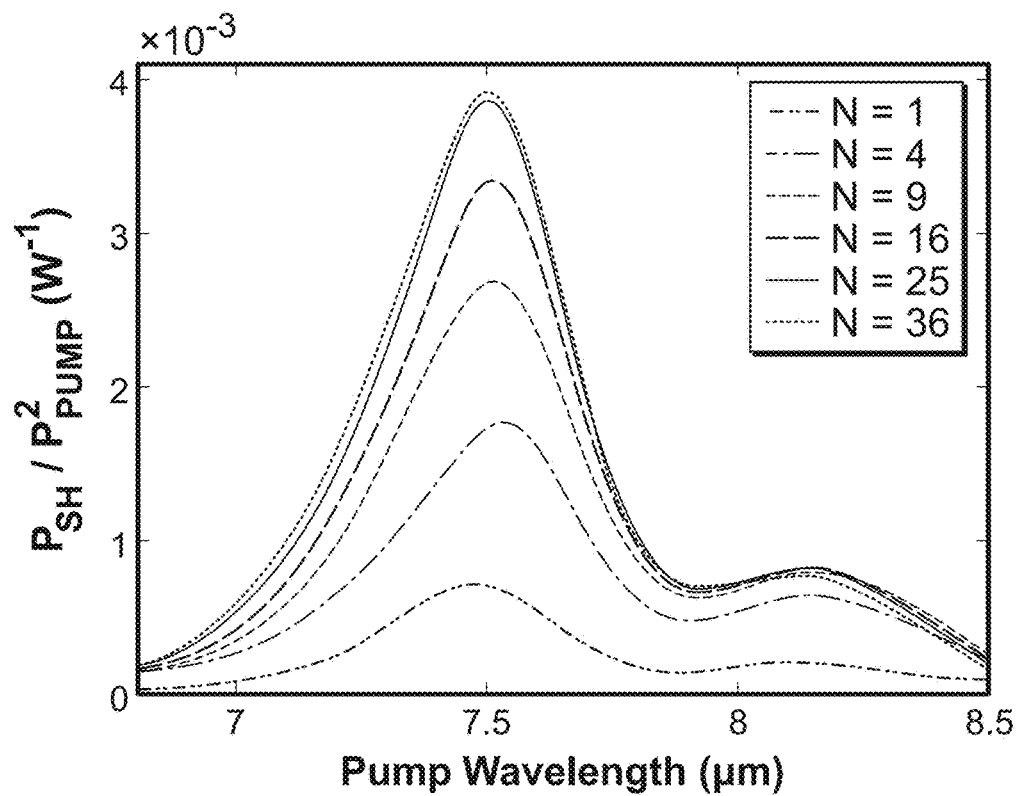
FIG. 15 is a graph of conversion efficiency, in normalized units, numerically calculated for normal incidence on a metasurface as a function of pump wavelength. Several finite sizes of arrays of resonator elements are represented as separate plots in the figure.

We performed numerical calculations of the SH generation efficiency for an array of resonators of several finite sizes. Our results are shown in FIG. 15.

The figures shows the conversion efficiency, in normalized units, for normal incidence on the metasurface as a function of pump wavelength. The radius R of the cylindrical resonator elements is fixed at R=1.4 µm. Each array of size N is a square N×N array with a period of 3R.

It can be seen from the figure that the spectral dependence of normalized SHG efficiencies is similar for different array sizes. We confirmed that there was a good correspondence to the experimental data.

It can also be seen from the figure that the absolute magnitude of the SHG efficiency initially increases rapidly as the number N of resonator elements in the array (i.e., the array size) increases from 1 to about 25. As N continues to increase above 25, the efficiency converges toward a value of about 4 mW/W². The field enhancements that we have computed for finite arrays are always smaller than those for infinite arrays. Consequently, the finite-sized arrays always have lower SHG efficiencies than a comparable infinite array.

Normal emission of second-harmonic light. As noted above, normal emission of second-harmonic light is suppressed when the pump beam is at normal incidence. This is a consequence of the in-plane inversion symmetry of the cylindrical resonator structures, together with the presence of only a single element $\chi_{zzz}^{(2)}$ in the second-order nonlinear susceptibility tensor. Because of these factors, the nonlinear polarization at the SH frequency is induced only in the z direction. This, in turn, results in the SH radiation being emitted only at off-normal angles, with zero SH power radiated along the normal direction.

Measures can be taken, however, to break the in-plane inversion symmetry and thereby permit normal emission of SH radiation. One possible approach, for example, is to reduce the symmetry of the individual resonator elements. Another possible approach is to modify the array so that it has a unit cell that lacks inversion symmetry. That could be achieved, for example, with a unit cell that is a cluster of two or more resonator elements in an arrangement without inversion symmetry.

The simplest approach, however, would be to tilt the direction of the pump beam so that the irradiation is off-normal. A suitable tilt angle would suffice to break the inversion symmetry and permit SH power to be radiated in the normal direction.

Figure 16:
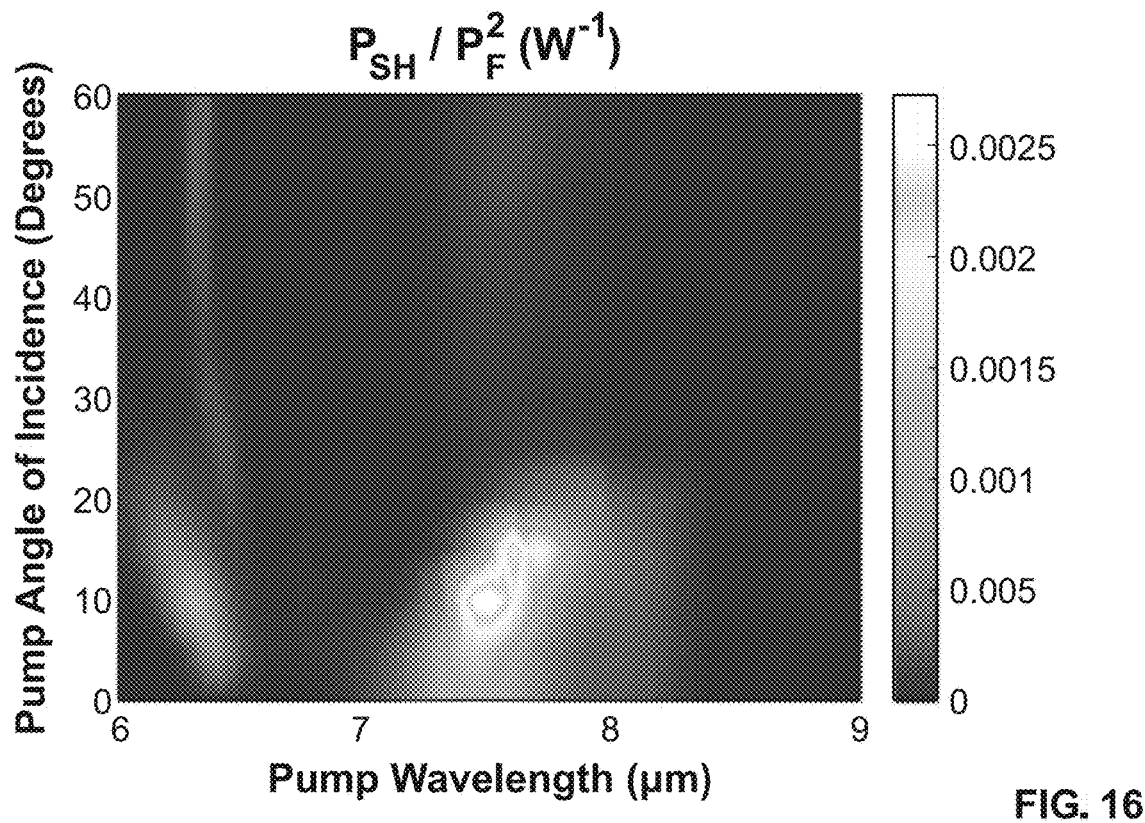
FIG. 16 is an intensity map in which the quantities plotted on the respective axes are pump angle of incidence and pump wavelength, and the intensity represents the SH power conversion efficiency.

We performed numerical simulations to test this approach. Our results are shown in FIG. 16, which is an intensity map in which the quantities plotted on the respective axes are pump angle of incidence and pump wavelength, and the intensity represents the SH power conversion efficiency. It will be evident from the figure that near the design pump wavelength, the SH power conversion efficiency is greatest at tilt angles in the range 10°-20°.

Controlling the sign of the susceptibility. As mentioned above, it is possible to control both the magnitude and sign of $\chi^{(2)}$ along the growth direction. The way this would be done is analogous to periodic poling of nonlinear crystals. Such control is possible because $\chi^{(2)}$ of the IST systems is proportional to the product of the three transition dipole moments $z_{12}$, $z_{23}$, and $z_{13}$. The respective signs of these moments can be flipped by reversing the order of the growth of the quantum wells in the asymmetric quantum well pairs.

The SH generation efficiency in each resonator is proportional to the product of $\chi^{(2)}$ and the second-harmonic electric field profile. Thus, it would be possible, in principle, to design Mie resonators in which the sign of $\chi^{(2)}$ is engineered to locally match the polarity of the SH field and thereby enhance the SH generation efficiency.

Other nonlinear optical phenomena. IST-based all-dielectric Mie metasurfaces can also be designed for other nonlinear optical phenomena such as sum frequency generation, third-harmonic generation, etc. They therefore offer an exciting and fundamentally new platform for studying nonlinear optics at the nanoscale. Such polaritonic all-dielectric metasurfaces thus offer a paradigm shift in the field of nonlinear metasurfaces that can offer new opportunities for developing new classical or quantum light sources for various applications ranging from spectroscopy, imaging, to sensing.

Figure 17:
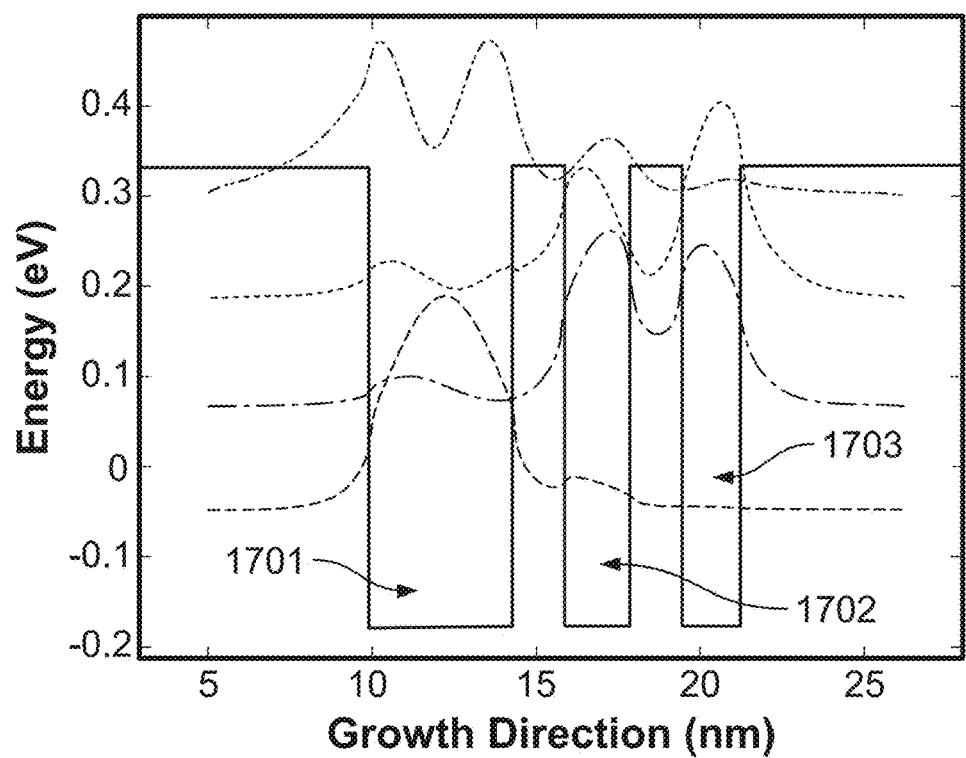
FIG. 17 is an energy-level diagram of an InGaAs/AlInAs coupled-well heterostructure with three equally spaced transitions, which can simultaneously generate both second-harmonic and third harmonic signals. Wavefunctions for the four electronic states are notionally represented in the figure, with vertical separations corresponding to their separations in energy.

By way of example, FIG. 17 is a diagram showing the growth sequence for a four-level IST system capable of generating both second-harmonic and third-harmonic radiation. As will be evident in the figure, there are now three asymmetric potential wells 1701, 1702, 1703. The III-V material system is the same as in the preceding examples. The widths of the respective potential barriers between wells are 1.6 nm The widths of the wells, in sequence from left to right in the view of the figure, are 4.3 nm, 2 nm, and 1.8 nm Alternative material systems. The example embodiments described above relate to quantum-well heterostructures fabricated in the InGaAs/AlInAs material system. Those examples should be understood as illustrative and non-limiting. Other material systems are also under contemplation as possible host systems for devices according to the principles described here and therefore falling within the scope and spirit of the present invention.

For example, alternate material systems may be based on Group III antimonide compounds. In one such system, the quantum well heterostructures may be constituted by aluminum antimonide (AlSb) and indium arsenide (InAs).

Figure 18:
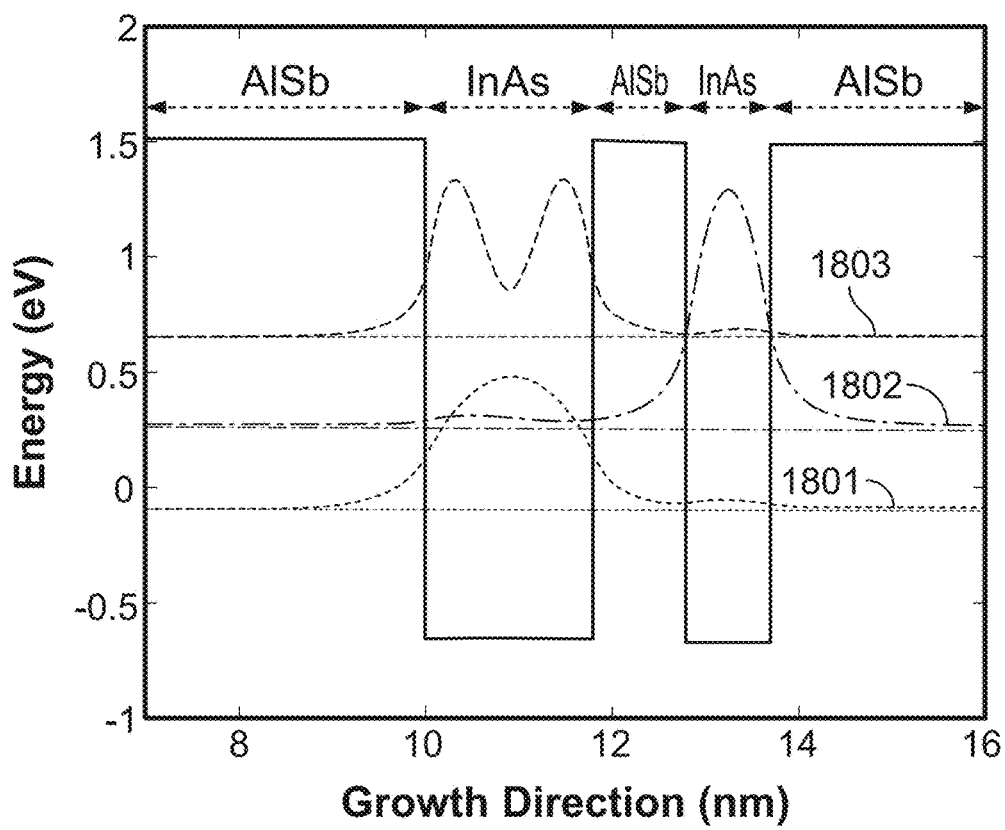
FIG. 18 is an energy-level diagram of an AlSb/InAs coupled well heterostructure. Wavefunctions for the lowest three electronic states are notionally represented in the figure, with vertical separations corresponding to their separations in energy. This structure can generate second harmonic light at 1.5 µm.

By way of illustration, FIG. 18 is an energy-level diagram of an AlSb/InAs coupled well heterostructure. Wavefunctions 1801, 1802, 1803 for the lowest three electronic states are notionally represented in the figure, with vertical separations corresponding to their separations in energy. The energy separations that are shown could potentially support the generation of second-harmonic light at a wavelength of about 1.5 µm from pump light at a wavelength of about 3 µm.

The invention claimed is:

1. Apparatus comprising a metasurface in which a plurality of elements is disposed on a substrate surface, wherein:
   each of the elements is an all-dielectric resonator body conformed to resonate at a first resonant frequency;
   each of the elements has at least some resonant response at a second resonant frequency that is a multiple of the first resonant frequency;
   each of the elements includes at least one multiple quantum well (MQW) structure constituted by a sequence of layers that defines multiple quantum wells;
   each MQW structure comprises at least one coupled quantum well (coupled QW) in which two or more dissimilar quantum wells are disposed sequentially;
   each of the coupled QWs is dimensioned to have at least a first, a second, and a third electronic eigenstate having respective energy levels;

the eigenstate energy levels are separated from each other by transition energies, each corresponding to a respective optical transition frequency;

the first resonant frequency is substantially equal to one of the optical transition frequencies; and the second resonant frequency is substantially equal to another of the optical transition frequencies.

2. The apparatus of claim 1, wherein the transition energies are energies of intersubband transitions of the MQW structures.

3. The apparatus of claim 1, wherein the elements are disposed in a periodic pattern on the substrate surface.

4. The apparatus of claim 1, wherein each of the resonator bodies is conformed to resonate at both the first and second resonant frequencies.

5. The apparatus of claim 1, wherein the first, second, and third electronic eigenstates have respective energy levels separated from each other by substantially equal separations in energy.

6. The apparatus of claim 1, wherein each of the resonator bodies comprises III-V semiconductor material.

7. The apparatus of claim 1, wherein each of the MQW structures is an InGaAs/AlInAs heterostructure.

8. The apparatus of claim 1, wherein the first resonant frequency belongs to a fundamental Mie resonance of the all-dielectric resonator bodies.

9. The apparatus of claim 1, wherein the first resonant frequency is a frequency of a magnetic dipole resonance of the all-dielectric resonator bodies.

10. The apparatus of claim 1, wherein the second resonant frequency lies within a portion of the electromagnetic spectrum extending from a vacuum wavelength of 1.5 μm to a vacuum wavelength of 4 μm.

11. The apparatus of claim 1, wherein each of the all-dielectric resonator bodies comprises Group-III antimonide material.

12. The apparatus of claim 1, wherein each of the MQW structures is an AlSb/InAs/AlSb heterostructure.

13. The apparatus of claim 1, wherein each of the coupled QWs has exactly two dissimilar quantum wells.

14. The apparatus of claim 1, wherein each of the coupled QWs has exactly three dissimilar quantum wells.

15. A method for generating harmonic light from a pump beam of light having a pump frequency, comprising:

impinging the pump beam on a metasurface comprising a plurality of all-dielectric resonator bodies, such that a Mie resonance is excited in each of the said bodies; and collecting harmonic light from the metasurface, the harmonic light having a frequency that is a multiple of the pump frequency, wherein:

the impinging of the pump beam excites a fundamental intersubband transition (IST) of MQW heterostructures contained within the said bodies, wherein the fundamental IST is coupled to a Mie resonance supported by the said bodies; and the impinging of the pump beam further excites at least one higher-order IST of the said MQW heterostructures, wherein the higher-order IST has a transition frequency that overlaps at least one Mie-resonant response of the said bodies having a frequency that is a harmonic of the pump frequency.

16. The method of claim 15, wherein the harmonic of the pump frequency is the second harmonic.

17. The method of claim 15, wherein the harmonic of the pump frequency is the third harmonic.

18. The method of claim 15, wherein the Mie resonance excited by impinging the pump beam is a fundamental Mie resonance of the all-dielectric resonator bodies.

19. The method of claim 15, wherein the Mie resonance excited by impinging the pump beam is a magnetic dipole resonance of the all-dielectric resonator bodies.

20. The method of claim 15, wherein the harmonic light lies within a portion of the electromagnetic spectrum extending from a vacuum wavelength of 1.5 μm to a vacuum wavelength of 4 μm.

* * * * *